(12) United States Patent
Heatley et al.

(10) Patent No.: US 9,398,256 B2
(45) Date of Patent: Jul. 19, 2016

(54) TELECOMMUNICATION END-POINT DEVICE DATA TRANSMISSION CONTROLLER

(71) Applicant: STARLEAF LTD, London (GB)

(72) Inventors: Richard Piers Heatley, Cambridge (GB); Samuel Thomas Jansen, Newmarket (GB); Nicholas Ian Moss, Middlesex (GB)

(73) Assignee: STARLEAF LTD, London (GB)

( * ) Notice: Subject to any disclaimer, the term of this patent is extended or adjusted under 35 U.S.C. 154(b) by 0 days.

(21) Appl. No.: 14/745,289

(22) Filed: Jun. 19, 2015

(65) Prior Publication Data

US 2016/0028992 A1    Jan. 28, 2016

(30) Foreign Application Priority Data

Jun. 20, 2014    (GB) .................. 1411040.7

(51) Int. Cl.
| | |
|---|---|
| *H04N 11/02* | (2006.01) |
| *H04N 7/14* | (2006.01) |
| *H04L 1/00* | (2006.01) |
| *H04L 1/08* | (2006.01) |
| *H04L 12/24* | (2006.01) |

(Continued)

(52) U.S. Cl.
CPC .............. *H04N 7/147* (2013.01); *H04L 1/0009* (2013.01); *H04L 1/0014* (2013.01); *H04L 1/0015* (2013.01); *H04L 1/0041* (2013.01); *H04L 1/08* (2013.01); *H04L 41/083* (2013.01); *H04L 43/0829* (2013.01); *H04L 43/0864* (2013.01); *H04L 43/0882* (2013.01); *H04L 47/12* (2013.01); *H04L 47/25* (2013.01)

(58) Field of Classification Search
USPC ....................................... 348/404.1
See application file for complete search history.

(56) References Cited

U.S. PATENT DOCUMENTS

| | | | | |
|---|---|---|---|---|
| 5,926,232 | A * | 7/1999 | Mangold et al. ..... | H04N 19/107 375/240.27 |
| 2010/0122141 | A1 | 5/2010 | Arye | |

(Continued)

FOREIGN PATENT DOCUMENTS

| | | |
|---|---|---|
| EP | 2019522 A2 | 7/2008 |
| WO | WO 2010/000910 A1 | 1/2010 |

(Continued)

OTHER PUBLICATIONS

Jean-Chyrstotome Bolot and Adres Vega-Garcia, "Control mechanisms for packet audio in the Internet," IEEE (1996) in 8 pages.

(Continued)

*Primary Examiner* — Creighton Smith
(74) *Attorney, Agent, or Firm* — Knobbe Martens Olson & Bear LLP

(57) ABSTRACT

A telecommunication channel data transmission controller 20 for controlling data transmission in a telecommunication channel typically forms part of a telecommunication end point device, such as a video phone 2. The data transmission controller 20 is configured to encode and transmit data in a telecommunication channel at a channel bit rate comprising a data rate and a redundancy rate; and maintain an increase in channel bit rate 70, if a packet loss rate in the telecommunication channel does not increase by increasing the channel bit rate including reducing or maintaining the data rate and increasing the redundancy rate 68.

18 Claims, 6 Drawing Sheets

(51) Int. Cl.
*H04L 12/26* (2006.01)
*H04L 12/801* (2013.01)
*H04L 12/825* (2013.01)

(56) References Cited

U.S. PATENT DOCUMENTS

2010/0328528 A1    12/2010  Eggert
2013/0034151 A1*   2/2013   Zhou et al. ............. H04N 19/42
                                                    375/240.03
2013/0185062 A1    7/2013   Krishnan et al.
2013/0191121 A1    7/2013   Rajendran et al.
2014/0297290 A1*   10/2014  Lee et al. ............. G10L 19/173
                                                    704/500

FOREIGN PATENT DOCUMENTS

WO    WO 2010/141762 A1    12/2010
WO    WO 2011/078995 A1    6/2011
WO    WO 2015/054512 A1    4/2015

OTHER PUBLICATIONS

Vicky Hardman and Mark Handley, "Reliable audio for use over the Internet" (1995) in 8 pages.
Search Report for Application No. GB 1411070.7 dated Dec. 12, 2014 in 5 pages.
Search and Examination Report for Application No. GB 1411040.7 dated May 22, 2015 in 4 pages.

* cited by examiner

TELECOMMUNICATION END-POINT DEVICE DATA TRANSMISSION CONTROLLER

FIELD OF THE INVENTION

The present invention relates to a telecommunication end-point device data transmission controller and a method of controlling data transmission. The present invention is particularly applicable to data transmission in the form of media streams from a telecommunication end-point device and especially a videophone.

BACKGROUND OF THE INVENTION

Many telecommunications networks, such as for making video calls using videophones, operate over a network and in particular the Internet that is used for other purposes. The bandwidth requirements of a video call over a video phone are high and for a good quality call experience it is important that those bandwidth requirements are consistently met from the network even in the presence of other data for other purposes using the network.

Current compressed media streams used for video phone calls are vulnerable to lost packets because information in the current packet often makes reference to information which should have been received in a previous packet. So, if that previous packet is not delivered the decoder at the far-end of the video phone call must somehow recover from the situation. This is typically achieved by requesting retransmission of the lost information or filling in with made-up information. In either case, the user will observe a discontinuity of video or audio which is not desirable.

Media devices such as telephones and videophones that work across such networks and in particular the Internet require some mechanism whereby they can efficiently share the network infrastructure with other network devices, such as computers and other non-video phone usage, taking into consideration the requirements of media streams to and from the devices and how they differ from those of ordinary data.

Examples of known telecommunication arrangements for achieving this are illustrated in FIGS. 1 and 2. The example arrangements illustrated have been simplified to aid understanding.

In the telecommunication network 7 of FIG. 1, a media device 2 in the form of a video phone is illustrated connected to the Internet 1 via a bandwidth-constrained link 4 controlled by a router 6. The media device 2 sends media, including a packetized audio stream and a packetized video stream, to a receiving device 3 in the form of another video phone. A competing device on the network, a personal computer (PC) 5 will also attempt to send information to the Internet over the same link causing what is described herein as a competing event. Under these circumstances, some compromise must be reached whereby the importance of the various data streams will determine the proportion of bandwidth that should be dedicated to them on the constrained link 4.

Wide-area networks such as the Internet 1 also have a very small randomly distributed packet loss. This is because the Internet is made up of small networks 31 (three such small networks are illustrated in FIG. 1 as a simple example) that are connected together by high bandwidth trunks 32 and there is often oversubscription on these high bandwidth trunks 32. However, these high bandwidth trunks or links carry so much traffic that the prior art considers that individual end users or media devices 2,3 will not be significantly impacted upon and so they are typically ignored in this context.

Real-time media streams for a call between video phones 2,3 typically have a minimum bandwidth threshold below which the media stream quality will be considered too bad to be acceptable. The router 6 controlling the constrained-bandwidth link 4 is configured to prioritise the traffic from real-time media streams up to this minimum bandwidth threshold and above this threshold to balance traffic from competing events such as from other sources, such as PC 5.

Since the router 6 allows bandwidth balancing for bandwidth between the minimum bandwidth threshold and the maximum bandwidth, if this region is used for the media stream between video phones 2,3 there will inevitably be unexpected packet loss which will result in the undesirable discontinuities whilst the streams recover.

There are two known types of arrangement that attempt to address this problem as follows.

One known attempt to address this problem is for the transmitting endpoint or video phone 2 to limit the media stream rate to the minimum bandwidth threshold. This ensures that packet loss is unlikely, but when no other device (such as PC 5) is using the bandwidth above the minimum threshold, this bandwidth is wasted instead of being used to improve video or audio quality of the media stream between video phones 2,3.

The other known attempt to address this problem is for the transmitting endpoint or video phone 2 to begin transmitting at maximum media stream rate and to react to packet loss, reducing the stream bitrate, until the packet loss rate is acceptable. FIG. 2 illustrates, in the form of a graph, how such an arrangement behaves. Broadly, the bandwidth 10 used by the media device 2 starts off at the maximum bandwidth 12, but data transmission from the PC 5 at times indicated by 13, 14 and 15 cause the media bitrate to drop to the minimum bandwidth indicated by 16.

The graph horizontal axis 11 is time and the area 10 shows the bandwidth utilisation by the media stream. The media stream begins transmitting at the maximum available bandwidth rate 12. After a while, at 13, the PC sends some data to the Internet 1 via router 6 and constrained link 4. This causes packet loss in the media stream in the constrained link. The receiving telephone 3 detects this loss and the transmitting phone 2 reacts by reducing the bitrate generated for the media stream. After a second period, at 14, the PC sends a larger chunk of data which causes more packet loss in the media stream in the constrained link. The transmitting telephone reacts again by reducing the bitrate yet further, which is, in this example, the minimum bandwidth threshold 16 for the media stream between the video phones 2,3. Later on, at 15, the PC sends a relatively small chunk of data. However, there has been no increase in the bandwidth available to the media stream between the video phones 2,3. So, in practice, this arrangement is no better off for at least some of the time illustrated than in the first solution described above as regards bandwidth available to the media stream between video phones 2,3, and the user has experienced two discontinuities in video or audio. Indeed, in practice, often the media stream bandwidth available between videophones 2,3 drops very quickly to the minimum bandwidth threshold and communication is largely effectively as the first arrangement described above.

It is considered that, if the transmitting telephone 2 attempts to increase the media bitrate in the hope that the competing event has finished, there is a high probability that packet loss will occur which will cause discontinuities that the user of the video phone end point devices 2,3 will notice. For this reason, it is considered beneficial in known implementations as explained above to remain at the lower bit rate for the remainder of the video phone call.

Another problem is evident in Internet telephony, which involves audio streams being sent over a wide-area network. The streams are sent as a series of packets containing timestamps and sequence numbers. The packets are not guaranteed to be delivered, and there is often a small but observable packet loss as a stream is sent across sections of the public Internet. The packet loss is usually a result of two effects. Firstly, too much data may be sent along a comparatively low bitrate "last-mile" connection (a communication connection near the target location, such as a local broadband connection). For example, during a telephone call an e-mail may be sent by a user using the same local broadband connection that causes the local broadband connection to become congested. In this circumstance, bandwidth management can be used to adjust the audio codec parameters to reduce the bitrate to allow both audio and email to share the connection. Secondly, the loss may be due to oversubscription on the trunks connecting Internet Service Providers (such as the high bandwidth trunks 32 of FIG. 1). In this circumstance, the amounts of data are so large that a single user cannot make a significant impact on the packet loss, and so adjusting a codec's bitrate will not alleviate the problem. This type of loss appears as a constant low background loss level as explained above.

When the packet loss is due to background losses, the two approaches to managing the problem are either to hide the missing packets by error concealment techniques such as playing the last packet again, or using forward error correction (FEC) to recover the contents of the missing packet.

Most FEC techniques allow a missing packet to be reconstructed by extra information held in the following N packets. If N is small then the size of the extra data must be large, but if N is large then it will take a long time for the missing packet to be reconstructed.

Since Internet telephony must be low latency, N must be kept small which means that to reconstruct the missing packets using known FEC techniques there must be a large overhead. For minimum latency N must be 1, and therefore the data rate must be doubled.

SUMMARY OF THE INVENTION

Generally, embodiments of the present invention provide a more reliable telecommunication network. Embodiments of the invention described herein address the problems of the prior art described above by providing a method and system which enable voice and videotelephony devices to make use of the shared bandwidth between the minimum bandwidth threshold and the maximum available bandwidth without compromising the integrity of the media streams.

Embodiments of the present invention include a system for managing media stream bitrates within channels of varying bandwidth. As a result of embodiments of the present invention, a telephone or video-telephone device connected to a network such as the Internet comprising bandwidth-constrained connections which are shared with other unrelated or bandwidth-competing devices compete for that bandwidth can efficiently use the available bandwidth without compromising the integrity of the media streams.

The inventors of the present application have also appreciated that, as well as unexpected loss on the constrained-bandwidth link 4 damaging the media stream, that the fairly constant small background loss on the high bandwidth trunks 32 also have an impact and needs to be anticipated and handled.

Embodiments of the present invention also relate to a system, device and method for providing forward error correction on low latency audio streams without large bandwidth overheads or significantly increasing overhead. These embodiments of the present invention also allow efficient use of the available bandwidth. They can be used in a stepwise increase of the FEC ratio (the ratio of data to redundancy) utilized in the embodiments of the present invention regarding managing media stream bitrates within channels of varying bandwidth.

Embodiments of the present invention provide a device and method that provide a compromise between providing no forward error correction but only relying on error concealment, and providing full forward error correction and doubling the bandwidth of the audio stream.

The system of embodiments of the present invention simultaneously runs two codecs, a high quality, high bitrate codec, and a lower quality, lower bitrate codec. The invention in its various aspects is defined in the independent claims below to which reference should now be made. Advantageous features are set forth in the dependent claims.

Arrangements are described in more detail below and take the form of a telecommunication channel data transmission controller for controlling data transmission in a telecommunication channel that typically forms part of a telecommunication end point device, such as a video phone. The data transmission controller is configured to encode and transmit data in a telecommunication channel at a channel bit rate comprising a data rate and a redundancy rate; and maintain an increase in channel bit rate, if a packet loss rate in the telecommunication channel does not increase by increasing the channel bit rate including reducing or maintaining the data rate and increasing the redundancy rate.

In a first aspect of the present invention, there is provided a telecommunication channel data transmission controller for controlling data transmission in a telecommunication channel, the data transmission controller being configured to: encode and transmit data in a telecommunication channel at a channel bit rate comprising a data rate and a redundancy rate; maintain an increase in channel bit rate, if a packet loss rate in the telecommunication channel does not increase by increasing the channel bit rate including reducing or maintaining the data rate and increasing the redundancy rate.

The data may comprise a representation of audio data and a representation of video data.

The telecommunication channel may be, at least in part, over the Internet.

The data transmission controller may be further configured to: determine a background error rate in the telecommunication channel and determine a background error rate compensation telecommunication channel bit rate comprising a data rate and a redundancy rate to provide a packet loss rate in the telecommunication channel at a predetermined level to compensate the background error rate; and encode and transmit data at the background error compensation telecommunication bit rate if this provides a packet loss rate at or below the predetermined level otherwise transmit data at a channel bit rate less than the background error rate compensation telecommunication channel bit rate.

The telecommunication channel data transmission controller may be further configured to determine the background error compensation telecommunication bit rate as the bit rate to compensate for a data rate: following a determination of no correlation between the packet loss rate and data rate following a reduction in data rate, stepwise further reducing the data rate until the packet loss rate is determined as constant after a stepwise reduction in the data rate.

The telecommunication channel data transmission controller may be further configured to encode and transmit at a maximum channel bit rate corresponding to the background error compensation telecommunication bit rate.

Packet loss may be caused by a competing event on the telecommunication channel caused by computer data traffic or non-video phone traffic.

The telecommunication channel data transmission controller may be further configured to: measure and store round-trip time for round-trip data transmission to and from a target; and in response to a reduction in round-trip time, carry out the step of increasing the channel bit rate including reducing or maintaining the data rate and increasing the redundancy rate.

The telecommunication channel data transmission controller may comprise an input for telecommunication data from a video phone separate from the telecommunication channel data transmission controller and the telecommunication channel data transmission controller encodes and transmits data input at the input from a video phone.

A video phone may comprise the telecommunication channel data transmission controller described above.

In another aspect of the present invention, there is provided a method of controlling telecommunication channel data encoding and transmission, the method comprising: encoding and transmitting data in a telecommunication channel at a channel bit rate comprising a data rate and a redundancy rate; maintaining an increase in channel bit rate, if a packet loss rate in the telecommunication channel does not increase by increasing the channel bit rate including reducing or maintaining the data rate and increasing the redundancy rate.

In another aspect of the present invention, there is provided an audio encoder for encoding audio for transmission on a telecommunication network, the audio encoder comprising: an audio input to input audio for encoding; a first encoder configured to encode the audio input at the audio input at a first data transfer rate; and a second encoder configured to encode the audio input at the audio input at a second data transfer rate less than the first data transfer rate the audio encoder being configured to output the encoded audio at the first transfer rate and encoded audio at the second transfer rate in different data packets.

In this way, a low overhead encoder such as a FEC encoder may be provided.

The audio encoder may be further configured to output at least some of the encoded audio at the first transfer rate and at least some of the encoded audio at the second transfer rate in adjacent data packets.

The audio encoder may be further configured to output at least a first time portion of the encoded audio at the first transfer rate and at least a second time portion of the encoded audio at the second transfer rate in the same data packet.

The first time portion may be adjacent the second time portion.

In another aspect of the present invention, there is provided an audio decoder for decoding audio for transmission on a telecommunication network, wherein the audio decoder is configured to: decode audio encoded at a second data transfer rate if the same audio encoded at a first data transfer rate cannot be decoded, wherein the second data transfer rate is less than the first data transfer rate and the audio encoded at the first transfer rate and the same audio encoded at the second transfer rate are in different data packets.

In this way, a low overhead decoder such as a FEC decoder may be provided.

The audio encoded at the first transfer rate and the audio encoded at the second transfer rate may be in adjacent data packets.

At least a first time portion of the audio encoded at the first transfer rate and at least a second time portion of the audio encoded at the second transfer rate may be in the same data packet.

The first time portion may be adjacent the second time portion.

The audio encoded at a first data transfer rate may not be decoded as a data packet in which it is carried is lost.

An audio codec may comprise the audio encoder and the audio encoder as described above. A video phone may comprise the audio encoder and the audio decoder described above.

The audio encoder may be a FEC encoder. The audio decoder may be a FEC decoder.

In another aspect of the present invention, there is provided a method of encoding audio for transmission on a telecommunication network, the method comprising: inputting at an audio input audio for encoding; a first encoder encoding the audio input at the audio input at a first data transfer rate; and a second encoder encoding the audio input at the audio input at a second data transfer rate less than the first data transfer rate; and outputting the encoded audio at the first transfer rate and encoded audio at the second transfer rate in different data packets.

The method may further comprise outputting at least some of the encoded audio at the first transfer rate and at least some of the encoded audio at the second transfer rate in adjacent data packets.

The method may further comprise outputting at least a first time portion of the encoded audio at the first transfer rate and at least a second time portion of the encoded audio at the second transfer rate in the same data packet.

The first time portion may be adjacent the second time portion.

In another aspect of the present invention, there is provided a method of decoding audio for transmission on a telecommunication network, the method comprising: decoding audio encoded at a second data transfer rate if the same audio encoded at a first data transfer rate cannot be decoded, wherein the second data transfer rate is less than the first data transfer rate and the audio encoded at the first transfer rate and the same audio encoded at the second transfer rate are in different data packets.

The audio encoded at the first transfer rate and the audio encoded at the second transfer rate may be in adjacent data packets.

At least a first time portion of the audio encoded at the first transfer rate and at least a second time portion of the audio encoded at the second transfer rate may be in the same data packet.

The first time portion may be adjacent the second time portion.

The audio encoded at a first data transfer rate may not be decoded as a data packet in which it is carried is lost.

A computer program may be configured to carry out the various methods described above.

A computer-readable medium may contain a set of instructions that causes a computer to perform the methods described above.

BRIEF DESCRIPTION OF THE DRAWINGS

The invention will be described in more detail, by way of example, with reference to the accompanying drawings, in which.

DETAILED DESCRIPTION

Figure 1:
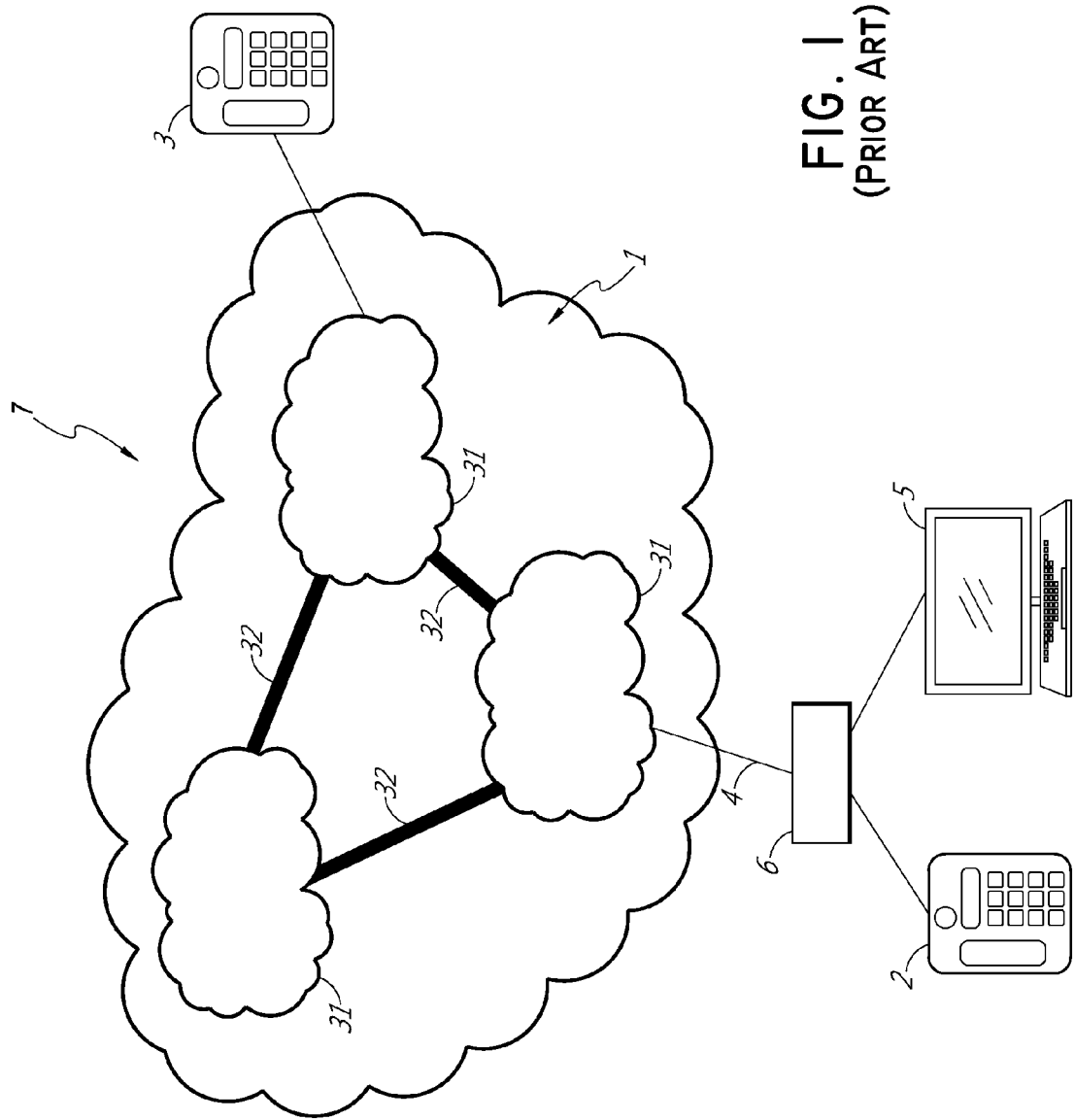
FIG. 1 (prior art) is a schematic diagram of a known telecommunication network.

A Telecommunication Channel Data Transmission Controller for Controlling Data Transmission An example telecommunication channel data transmission controller 20 for controlling data transmission on a telecommunication channel or bandwidth management system and method of controlling telecommunication channel data transmission will now be described with reference to FIGS. 3 to 5. Generally, like features of the arrangement of FIGS. 3 to 5 have been given the same reference numerals as like features of the arrangement of FIGS. 1 and 2.

Figure 3:
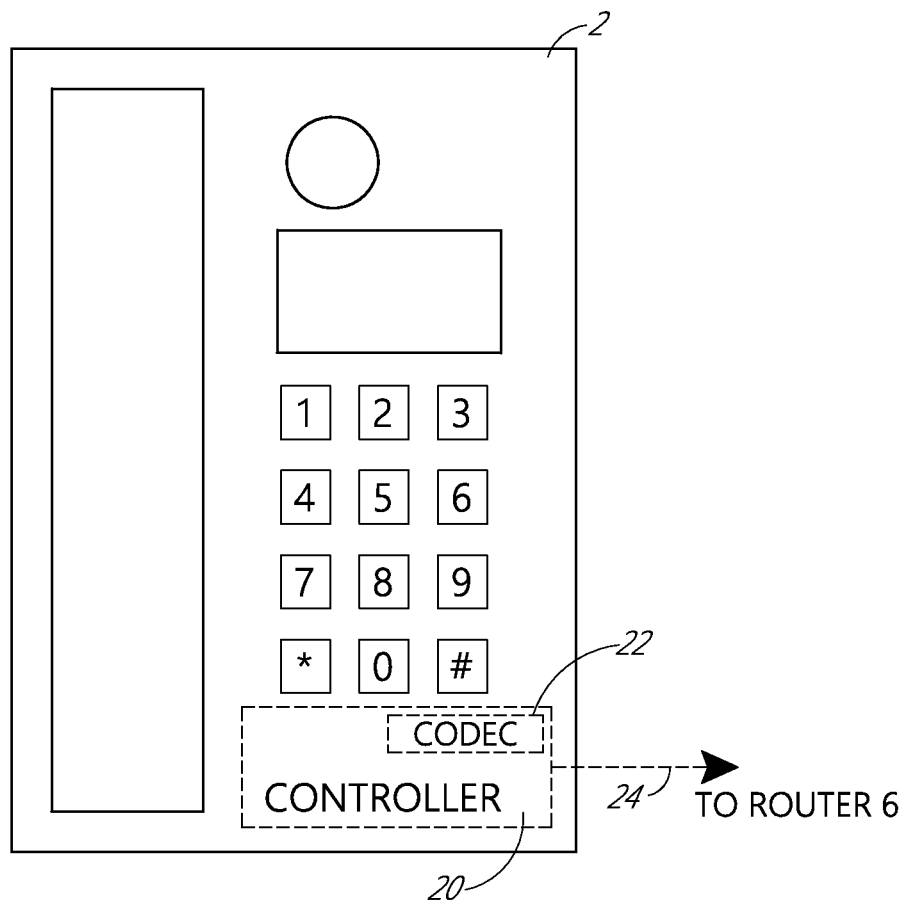
FIG. 3 is a schematic illustrating a video phone including a telecommunication channel data transmission controller embodying an aspect of the present invention.

In the example of FIG. 3, the data transmission controller 20 is integrated with a telephony device in the form of a video phone 2. The data transmission controller may be a dedicated hardware device or implemented in software or as a computer program. Alternatively (and not illustrated), the data transmission controller 20 may be implemented in software or as a computer program on a computer such as a desktop computer, a laptop computer, a tablet computer or a smart phone. The software or computer program may be provided on a computer readable medium or storage device or devices of the computers such as a hard disk drive or solid state memory.

In practice, the router 6 of FIG. 1 may be connected to a plurality of telecommunication end point devices 2 each including a data transmission controller 20. However, in this example, a single telecommunication end point device 2 including a data transmission controller 20 is illustrated for simplicity of explanation.

The data transmission controller 20 includes a codec 22 that encodes the digital media stream for output to the router 6 from output 24 and decodes the digital media stream received from the router providing for error correction and detection.

Media data including a representation of both video and audio data is transmitted or output from output 24 of controller 20 of video phone 2. The data is packetized and encoded by the codec 22 to include redundancy to detect and correct errors in it caused by packet losses during transmission to the target video phone 3. Detection and correction of such losses may be by known techniques, which are typically different depending on the type of data.

For audio traffic or data, the small constant loss caused by oversubscription of high bandwidth trunks 32 in the Internet as described above is most easily hidden by error concealment techniques, for example, by replaying the last few received samples, or by using a low-latency Forward Error Correction (FEC) applied by the codec such as duplicating audio blocks in subsequent packets.

For video traffic, the codec is typically configured to request retransmission or have some mechanism for FEC such as a Reed Solomon code.

In this FEC technique, a message or data is encoded in a redundant way by using an error-correcting code. The redundancy allows a receiver of the data to reconstruct a limited number of missing packets from a stream of packets using extra information held in the surrounding packets. The more redundancy that is encoded in the messages or data the greater the number of packet-loss errors that can be corrected at the receiver.

As mentioned above, the inventors of the present application have appreciated that the fairly constant small background loss on the high bandwidth trunks 32 of the Internet (illustrated in FIG. 1) have an impact on the quality of the media stream. The inventors of the present application have appreciated that this background loss needs to be anticipated and handled as well as the loss on the constrained-bandwidth link 4. However, the cause of packet loss whether on the constrained link 4 or high bandwidth trunks 32 needs to be found so that it can be properly remedied. To address this, the controller 20 in video phone 2 of embodiments of the present invention operate or carry out the method as illustrated in the flow diagram of FIG. 4. The controller also assesses when one or more competing event is over and the bit rate available to the video phone is then increased accordingly and up to a maximum allowed for the end-to-end path, including FEC compensation for losses in the high bandwidth trunks 32.

Figure 2:
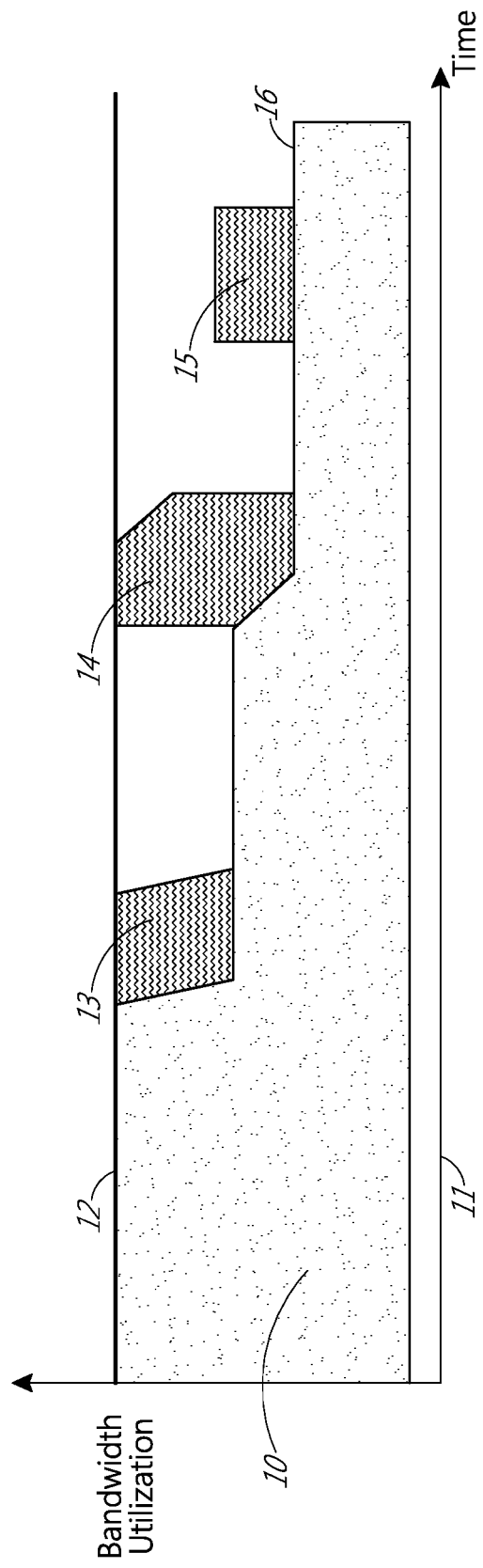
FIG. 2 (prior art) is a graph illustrating an example method of controlling bandwidth available to media devices on the telecommunication network of FIG. 1.

At the start of a video call (with video and audio) from video phone 2, the transmission controller 20 takes media streams or data from the video phone's capture sources and selects a starting bitrate (step 48 of FIG. 4) arbitrarily and sends media (including video and audio data) from the video phone 2 at that bitrate. Packet loss may then be experienced before the media reaches the target video phone for the video call 3, which could be as a result of the small background loss on high bandwidth trunks 32, or it could be because of a competing event on the constrained link 4 (such as indicated in FIG. 2 by reference numerals 13, 14, or 15). This packet loss is measured by the receiving video phone 3 and sent back to the transmitting video phone 2 (step 50 of FIG. 4). The transmitting phone's controller 20 then assesses if the packet loss is greater than a predetermined amount (step 52 of FIG. 4). This predetermined amount is the amount that would detrimentally affect the quality of the video and/or audio experienced by the target video phone 3. If the packet loss is greater than this predetermined amount, then the controller determines the cause of the loss (background losses or due to a competing event on the constrained link) otherwise transmission continues at the same bit rate.

Figure 4:
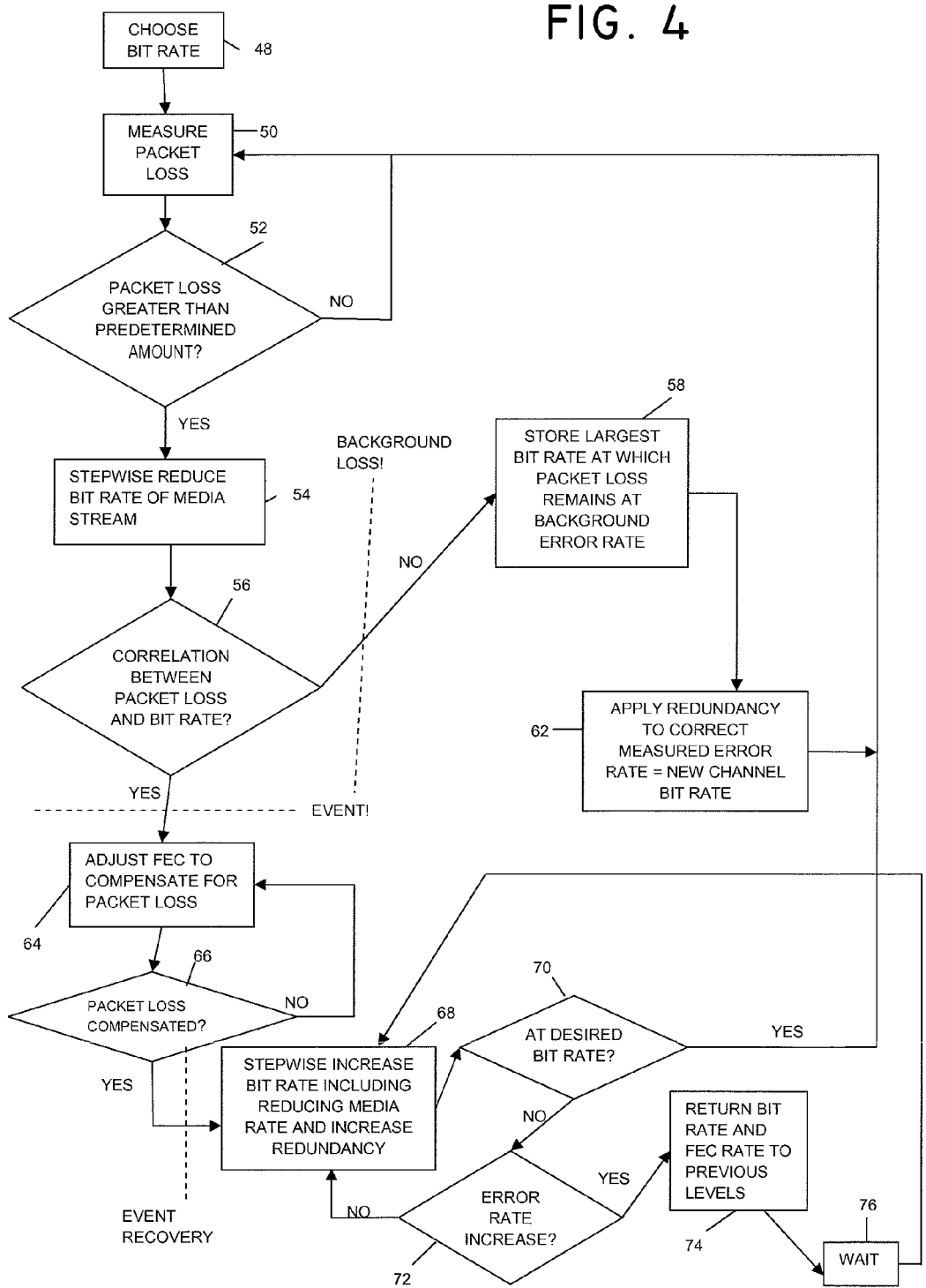
FIG. 4 is a flow diagram illustrating the method implemented by the telecommunication end-point device data transmission controller of FIG. 3.

In order to determine the cause of the loss, the controller 20 in video phone 2 systematically or stepwise reduces the bitrate of the media stream 41 (step 54 of FIG. 4) and looks or measures the packet loss rate that results from each stepwise bitrate reduction and assesses whether there is correlation between the packet loss rate and the bitrate indicating that the packet loss is a result of a competing event on the constrained link (step 56 of FIG. 4).

If there is no such correlation that is, the error rate remains constant regardless of bitrate), then the error rate is measured and recorded as the current background error rate (or packet loss rate) for the high bandwidth trunk 32. During the stepwise reduction, the largest bit rate at which packet loss rate remained at the background error rate is stored (step 58 of FIG. 4) and is now used as the new transmission bitrate. Adequate redundancy is then applied to the data stream by, in this example, applying a FEC to the media data by the controller 20 that is then output from output or channel 24 to compensate for the background error rate (step 62 of FIG. 4). This defines a background error compensation telecommunication bit rate. The stored bit rate then defines this new rate ceiling and this is used as the new channel bitrate output from output 24 of the controller forming a channel to the target video phone 3.

If there is a correlation between the packet loss rate and the bitrate, then the bitrate is reduced until there is no further reduction in packet loss for any reduction in bit rate. The FEC is adjusted (step 64 of FIG. 4) until the residual packet loss is compensated (the packet loss rate is less than a predetermined amount) (step 66 of FIG. 4) so that the receiving telephone 3 can reconstruct a clear media stream.

Once the media bitrate for the channel has been reduced in response to a competing event, the problem that the telecommunication system faces is that it does not know whether the competing event has finished and whether bandwidth on the bandwidth-constrained link 4 is now wasted (not being used), or if the competing event is still in progress.

Instead of arbitrarily increasing the media bitrate that is output from output 24 as in the prior art, significantly, the example transmission controller 20 embodying the present invention, systematically changes the FEC parameters stepwise or increases the amount of redundant data in the data stream output from output 24 of the videophone 2 to slightly increase both the transmission bitrate and the ability for the FEC to recover from lost packets whilst keeping the media bitrate the same (maintain it) or, if necessary, slightly reducing it (step 68 of FIG. 4). By doing this, the inventors of the present application have appreciated that the video phone 2 can increase the load on the network, expect the additional packet loss and recover from it. Packet loss continues to be measured during the stepwise increase of the channel bit rate including stepwise reducing or maintaining the data rate and stepwise increasing the redundancy rate (step 68 of FIG. 4) while there is no increase in the error rate (step 72 of FIG. 4) or the packet loss or available bit rate is at the desired level (the background error compensation bit rate), then the stepwise increasing of the bit rate is terminated and transmission from the video phone 2 is restored to background error compensation bit rate (step 70 of FIG. 4). In other words, if increased packet loss does not happen, then the transmission controller 20 in the video phone 2 reduces the FEC ratio (or reduces the redundancy in the data) and increases the media bitrate and hence provides an improved quality video or audio experience for the user. The process of measuring packet loss and assessing whether packet loss is greater than a predetermined amount is then repeated until either significant packet loss occurs or the maximum channel bandwidth is reached.

However, if there is an increase in the bit error rate, after the transmission controller 20 in video telephone 2 has changed the FEC parameters stepwise to increase the amount of redundant data in the data stream output from output 24 of the video telephone 2 to slightly increase the transmission bitrate whilst maintaining the media bitrate (or slightly reducing it) and if packet loss is greater than a predetermined amount then it is concluded that the competing event is still in progress, and the bitrate and FEC ratio are returned to their previous settings or levels (step 74 of FIG. 4). The controller 20 then waits for a short period (step 76 of FIG. 4) and then again the controller stepwise increases the bit rate including increasing the transmission bitrate whilst maintaining the media bitrate (or slightly reducing it) (step 68 of FIG. 4) and the process continues.

Figure 5:
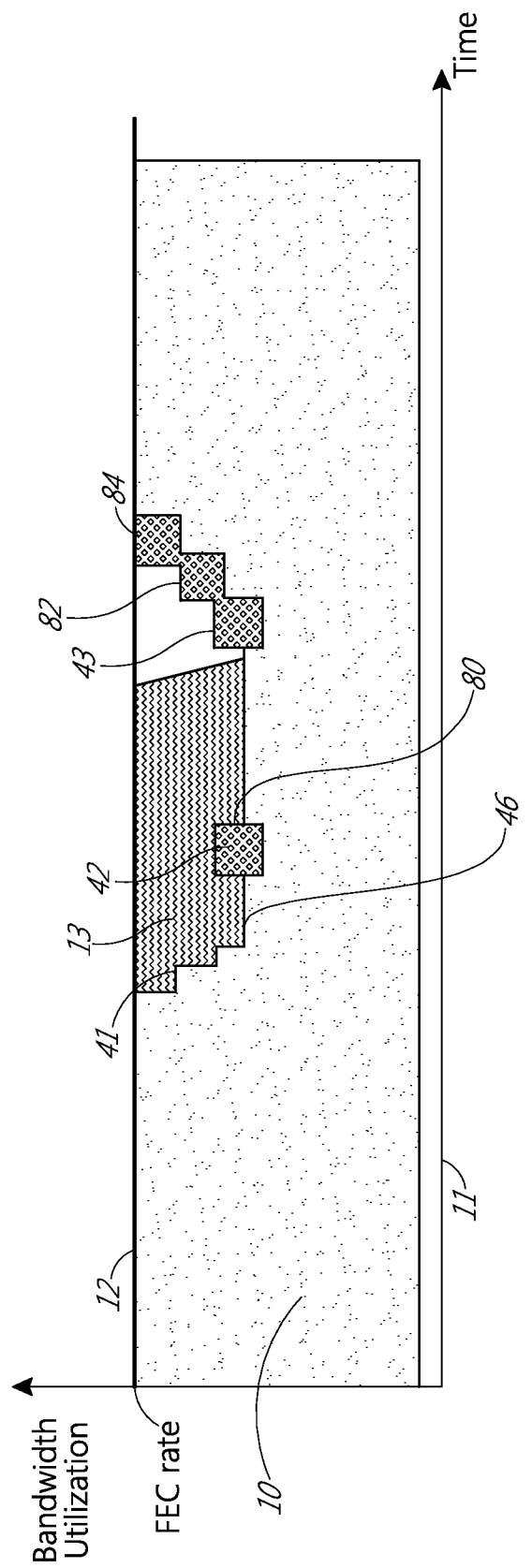
FIG. 5 is a graph illustrating the method implemented by the telecommunication end-point device data transmission controller of FIG. 3.

FIG. 5 is a graph that illustrates the method implemented by the telecommunication end-point device data transmission controller 20 of FIG. 3 and illustrated in the flow diagram of FIG. 4.

As in the graph of the prior art of FIG. 2, the graph horizontal axis 11 in FIG. 5 is time and the area 10 shows the bandwidth utilisation or bit rate used by the media stream as well as the FEC rate. The media stream begins transmitting at the maximum available bandwidth rate 12 (step 48 of FIG. 4). The packet loss is measured (step 50 of FIG. 4). After a while, at 13, a PC sends some data to the Internet 1 via router 6' and constrained link 4. In other words, a competing event is initiated, but the transmission controller 20 of video telephone 2 does not know the reason for the packet losses caused. In practice, packet loss in the media stream is caused in the constrained link when traffic on the link exceeds the capacity of the link. The transmission controller 20 reacts by stepwise reducing the bitrate or data rate (step 54 of FIG. 4) or stepping down of bitrate (reference numeral 41 in FIG. 5) to ascertain whether this loss is due to a competing event or to background error. In this case, a correlation between packet loss and bit rate is detected (step 56 of FIG. 4) and bitrate continues to be reduced stepwise until the packet loss stops (step 64 and 66 of FIG. 4, reference numeral 46 of FIG. 5). After a short period, the transmission controller 20 then increases the redundant data or increases the FEC rate stepwise (step 68 of FIG. 4, reference numeral 80 of FIG. 5) to probe the channel to discover whether the competing event 13 is still in progress or not. To do this, the controller 20 stepwise increases the bit rate including increasing the transmission bitrate and maybe reducing the media bitrate (step 68 of FIG. 4, reference numeral 80 of FIG. 5). However, as this increases the error rate (as the competing event 13 is still underway), the transmission controller 20 returns the bit rate and the FEC or redundancy rate back to their previous levels (step 74 of FIG. 4). After a short wait or period (step 76 of FIG. 4), the transmission controller 20 again stepwise increases the bit rate including increasing the transmission bitrate and reducing the media bitrate (step 68 of FIG. 4, reference numeral 43 of FIG. 5). As the competing event 13 has now finished, the measurement of the error rate caused by the stepwise increase in transmission bit rate does not increase the error rate (step 72 of FIG. 4) and the bit rate is continued to be stepwise increased (reference numeral 82 of FIG. 5, step 68 of FIG. 4) until the desired bit rate is met (reference numeral 84 of FIG. 5, step 70 of FIG. 4).

Thus, the recovery mechanism to restore the channel to full bandwidth after the event 13 has completed is illustrated.

In an alternative example, the sending video telephone 2 and the receiving video telephone 3 or target measure the round-trip time on the end-to-end connection between them. This is usually monitored as an interesting measurable statistic because it can be used to indicate the existence of a problem somewhere along the connection. Round trip latency increases when a link is being shared because packet queuing starts to occur on the link. In this example, when the controller 20 is waiting momentarily and the bit rate and the FEC or redundancy rate are level before probing to ascertain whether a competing event has ended by stepwise increasing the bit rate including reducing the media rate and increasing the redundancy as illustrated in FIG. 4 state 76, the transmission controller 20 can observe by measuring and storing the round-trip latency or time and look for reductions in latency. Reduction in latency can be an indication that less queuing is occurring and so the competing event may be over. This can be used to trigger a new test, state 68 of FIG. 4, when a stepwise increase in the bit rate (including reducing or maintaining the media or data rate and increasing the redundancy rate) is made in response to a reduction in round-trip time.

Audio Codec

As mentioned in the background section above, in the known telecommunication network 7 of FIG. 1, a media device 2 in the form of a video phone is illustrated connected to the Internet 1. The media device 2 sends media to a receiving media device 3 in the form of another video phone. This media includes an audio stream containing packetized audio data.

Figure 6:
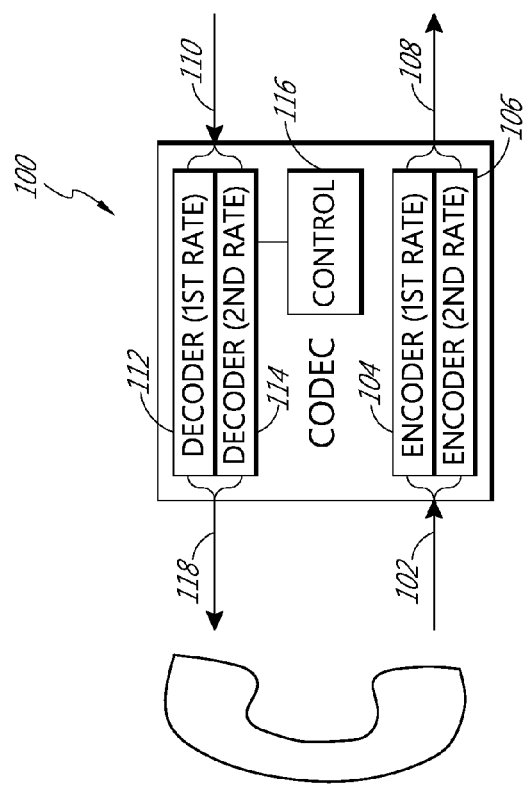
FIG. 6 is a schematic illustrating an audio codec embodying another aspect of the present invention.

In embodiments of the present invention, the media devices 2, 3 also include an audio codec 100 as illustrated in FIG. 6. As mentioned above, the media devices or video phones may be dedicated hardware devices or implemented in software on a computer such as a desktop computer, laptop computer, tablet or smart phone. The codec of the video phones may be implemented in software as a computer program on these devices (in which case, a computer-readable medium such as a hard disk drive or solid state memory containing a set of instructions is provided that causes a computer to perform the relevant method) or as dedicated hardware.

As illustrated in FIG. 6, an audio encoder of the codec 100 includes an audio input 102 to input audio for encoding. There are a pair of encoders 104, 106 forming the audio encoder. The first encoder 104 encodes the audio input at the audio input at a first data transfer rate or quality. The second encoder 106 encodes the same audio input at the audio input at a second data transfer rate or quality that is less than the first data transfer rate or quality. The audio encoder has an output 108 to output the encoded audio at the first transfer rate and encoded audio at the second transfer rate in different data packets. This arrangement of redundant information forms a FEC mechanism for correcting packet-loss errors.

Similarly, an audio decoder of the codec 100 receives encoded audio data from a telecommunication network at an input 110. The encoded audio data includes the same audio encoded at a first data transfer rate and at a second data transfer rate, in which the audio encoded at a first data transfer rate is in different data packets to the audio encoded at the second data transfer rate. The audio decoder includes a pair of decoders, a first decoder 112 and a second decoder 114. The first decoder decodes FEC encoded audio at the first data transfer rate and the second decoder decodes FEC encoded audio at the second data transfer rate. The codec includes a controller 116 that receives electrical signals from and transmits electrical signals to the decoders, including a signal from the first decoder indicating that it cannot decode encoded audio data received at the input 110. If the same audio encoded at a first data transfer rate cannot be decoded by the first decoder, then a signal is sent from the controller to the second decoder to decode the same audio encoded at the second transfer rate. The decoded data (either at the first or second data rate) is output from output 118 of the codec.

Thus, the system effectively simultaneously runs two audio codecs or encoders, a high quality high bitrate codec or encoder and a lower quality lower bitrate codec encoder. For example, the higher quality codec may be G.711 at 64 kbps and the lower quality codec may be G.729 at 8 kbps.

For each group of audio samples, the equivalent blocks of encoded data are created. Generally, the audio packets of the packetized audio stream output from the audio encoder include at least some of the encoded audio at the first transfer rate and at least some of the encoded audio at the second transfer rate in adjacent data packets. At least a first time portion of the encoded audio at the first transfer rate and at least a second time portion, adjacent the second time portion, of the encoded audio at the second transfer rate are in the same data packet. In the example described below, the media packets are constructed to include both the current block from the high quality codec, and the previous block from the low quality codec.

Figure 7:
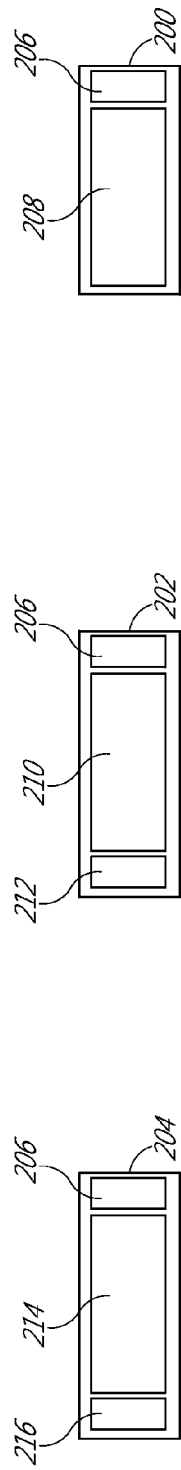
FIG. 7 is a schematic illustrating an audio data stream created by the audio codec of FIG. 6.

FIG. 7 illustrates three data packets constructed and output by the audio encoder of the codec that may be received by another codec to be a decoder of its codec. It illustrates a sequence of audio packets 200, 202, 204 output from and travelling from media endpoint or video phone 2 to media endpoint or video phone 3.

In the example of FIG. 7, each packet 200, 202, 204 has a header 206 and also contains two payloads. The first packet 200 contains the high quality payload of the first group of samples 208. The second packet 202 contains the high quality payload of the second group of samples 210 and the low quality payload of the first group of samples 212 (that is to say, a low quality payload equivalent to the high quality payload of the previous-in-time packet). The third packet contains the high quality payload for the third group of samples 214 and the low quality payload for the second group of samples 216.

The receiving system or codec 100 on observing a dropped packet can then decode the lower quality payload from the following packet in order to provide an approximation for the audio from the missing high quality packet.

This means that a usable error-correction for random packet loss in the stream has been achieved for a relatively small overhead in extra packet size, in this example, approximately 10% overhead in packet size taking packet headers into consideration.

There are variations to this technique that may be made.

For example, the choice of low-quality codec may be made based on the processing capabilities of the endsystem or videophone and the bandwidth requirements. For example, instead of G729 at 8 kbps for the low-quality codec, G726 at 32 kbps could be used for a less than 50% overhead after packet headers have been included in the calculation, but a much lower algorithm complexity.

For example, the system may make use of bitstream codecs such as G726 if the codec state is either transmitted at the start of each payload, or reset at the start of each packet.

For example, the same codecs may be used for both the high and low quality codec. This situation could be useful if a high quality codec is being used with no error correction but packet loss is predicted due to some network event and it would be beneficial to enable error correction without increasing bandwidth. To achieve this, by way of example, the system may usually use G711 64 kbps for the unprotected codec, and switch to G726 32 kbps for both current and delayed streams. A user may notice a small drop in audio quality but not be impacted as much as for packet loss on an unprotected high quality stream. In this situation, bitstream codecs may be used without needing to handle the loss of state since the previously encoded packet would be available in the other stream.

Embodiments of the present invention have been described. It will be appreciated that variations and modifications may be made to the described embodiments within the scope of the present invention.

The invention claimed is:

1. A telecommunication channel data transmission controller for controlling data transmission in a telecommunication channel, the data transmission controller being configured to:
    encode and transmit data in a telecommunication channel at a channel bit rate comprising a data rate and a redundancy rate; and continue to stepwise increase the channel bit rate, if a packet loss rate in the telecommunication channel does not increase by stepwise increasing the channel bit rate including stepwise reducing the data rate and stepwise increasing the redundancy rate.

2. A telecommunication channel data transmission controller according to claim 1, wherein the data comprises a representation of audio data and a representation of video data.

3. A telecommunication channel data transmission controller according to claim 1, wherein the telecommunication channel is, at least in part, over the Internet.

4. A telecommunication channel data transmission controller according to claim 1, wherein the data transmission controller is further configured to:
determine a background error rate in the telecommunication channel and determine a background error rate compensation telecommunication channel bit rate comprising a data rate and a redundancy rate to provide a packet loss rate in the telecommunication channel at a predetermined level to compensate the background error rate; and
encode and transmit data at the background error compensation telecommunication bit rate if this provides a packet loss rate at or below the predetermined level otherwise transmit data at a channel bit rate less than the background error rate compensation telecommunication channel bit rate.

5. A telecommunication channel data transmission controller according to claim 4, further configured to determine the background error compensation telecommunication bit rate as the bit rate to compensate for a data rate:
following a determination of no correlation between the packet loss rate and data rate following a reduction in data rate, stepwise further reducing the data rate until the packet loss rate is determined as constant after a stepwise reduction in the data rate.

6. A telecommunication channel data transmission controller according to claim 4, further configured to encode and transmit at a maximum channel bit rate corresponding to the background error compensation telecommunication bit rate.

7. A telecommunication channel data transmission controller according to claim 1, wherein packet loss is caused by a competing event on the telecommunication channel caused by computer data traffic or non-video phone traffic.

8. A telecommunication channel data transmission controller according to claim 1, wherein the telecommunication channel data transmission controller is further configured to:
measure and store round-trip time for round-trip data transmission to and from a target; and
in response to a reduction in round-trip time, carry out the step of increasing the channel bit rate including reducing or maintaining the data rate and increasing the redundancy rate.

9. A telecommunication channel data transmission controller according to claim 1, wherein the telecommunication channel data transmission controller comprises an input for telecommunication data from a video phone separate from the telecommunication channel data transmission controller and the telecommunication channel data transmission controller encodes and transmits data input at the input from a video phone.

10. A method of controlling telecommunication channel data encoding and transmission, the method comprising:
encoding and transmitting data in a telecommunication channel at a channel bit rate comprising a data rate and a redundancy rate; and
continuing to stepwise increase the channel bit rate, if a packet loss rate in the telecommunication channel does not increase by stepwise increasing the channel bit rate including stepwise reducing the data rate and stepwise increasing the redundancy rate.

11. An audio encoder for encoding audio for transmission on a telecommunication network, the audio encoder comprising:
an audio input to input audio for encoding;
a first encoder configured to encode the audio input at the audio input at a first data transfer rate; and
a second encoder configured to encode the audio input at the audio input at a second data transfer rate less than the first data transfer rate;
the audio encoder being configured to output at least some of the encoded audio at the first transfer rate and at least some of the encoded audio at the second transfer rate in adjacent data packets.

12. An audio encoder for encoding audio for transmission on a telecommunication network, the audio encoder comprising:
an audio input to input audio for encoding;
a first encoder configured to encode the audio input at the audio input at a first data transfer rate; and
a second encoder configured to encode the audio input at the audio input at a second data transfer rate less than the first data transfer rate;
the audio encoder being configured to output at least a first time portion of the encoded audio at the first transfer rate and at least a second time portion of the encoded audio at the second transfer rate in the same data packet.

13. An audio encoder according to claim 12, wherein the first time portion is adjacent the second time portion.

14. An audio decoder for decoding audio for transmission on a telecommunication network, wherein the audio decoder is configured to:
decode audio encoded at a second data transfer rate if the same audio encoded at a first data transfer rate cannot be decoded, wherein the second data transfer rate is less than the first data transfer rate and the audio encoded at the first transfer rate and the same audio encoded at the second transfer rate are in different data packets.

15. An audio decoder according to claim 14, wherein the audio encoded at the first transfer rate and the audio encoded at the second transfer rate are in adjacent data packets.

16. An audio decoder according to claim 14, wherein at least a first time portion of the audio encoded at the first transfer rate and at least a second time portion of the audio encoded at the second transfer rate are in the same data packet.

17. An audio decoder according to claim 16, wherein the first time portion is adjacent the second time portion.

18. An audio decoder according to claim 14, wherein the audio encoded at a first data transfer rate cannot be decoded as a data packet in which it is carried is lost.

* * * * *